US007374389B2

(12) United States Patent
Wilson

(10) Patent No.: US 7,374,389 B2
(45) Date of Patent: May 20, 2008

(54) DEVICE FOR UNLOADING BULK MATERIAL FROM A LIVE-FLOOR VEHICLE

(75) Inventor: Jim Wilson, Easley, SC (US)

(73) Assignee: Upstate Mulch Products and Services, Inc., Greer, SC (US)

( * ) Notice: Subject to any disclaimer, the term of this patent is extended or adjusted under 35 U.S.C. 154(b) by 168 days.

(21) Appl. No.: 11/203,757

(22) Filed: Aug. 15, 2005

(65) Prior Publication Data

US 2007/0048114 A1    Mar. 1, 2007

(51) Int. Cl.
*B60P 1/36* (2006.01)
*B60P 1/40* (2006.01)

(52) U.S. Cl. ............... 414/502; 414/505; 414/523; 198/313

(58) Field of Classification Search ............... 414/502, 414/503, 505, 523, 525.1; 198/313
See application file for complete search history.

(56) References Cited

U.S. PATENT DOCUMENTS

| | | | | |
|---|---|---|---|---|
| 2,609,115 A | | 9/1952 | Oklejas | 214/83.26 |
| 2,675,932 A | * | 4/1954 | Potter | 414/523 |
| 2,715,972 A | * | 8/1955 | Grygiel | 414/523 |
| 2,834,487 A | | 2/1958 | Gaddis | 214/83.26 |
| 3,122,251 A | * | 2/1964 | Gardipee | 414/489 |
| 3,280,994 A | * | 10/1966 | Herpich et al. | 414/525.54 |
| 3,483,717 A | | 12/1969 | Mayer | 63/15.6 |
| 3,521,767 A | | 7/1970 | Rossi | 214/83.26 |
| 3,770,101 A | * | 11/1973 | Carlson | 198/632 |
| 3,910,437 A | * | 10/1975 | James | 414/489 |
| 3,923,175 A | | 12/1975 | Landvatter | 214/509 |
| 4,072,242 A | | 2/1978 | Cook | 414/522 |
| 4,149,642 A | * | 4/1979 | Schneider | 414/523 |
| 4,398,859 A | * | 8/1983 | Ball | 414/523 |
| 4,505,634 A | | 3/1985 | Rezac | 414/528 |
| 4,781,513 A | * | 11/1988 | Ajogren et al. | 414/489 |
| 5,044,867 A | | 9/1991 | Pettijohn | 414/523 |
| 5,190,432 A | * | 3/1993 | Gerow | 414/489 |
| 5,286,158 A | * | 2/1994 | Zimmerman | 414/504 |
| 5,443,351 A | | 8/1995 | Pettijohn | 414/523 |
| 5,551,776 A | * | 9/1996 | Zimmerman | 366/68 |
| 5,556,237 A | * | 9/1996 | Rexius | 406/32 |
| 6,698,997 B2 | * | 3/2004 | Arne et al. | 414/502 |

FOREIGN PATENT DOCUMENTS

GB    2115773 A   *   9/1983

OTHER PUBLICATIONS

Advertisement for Simonsen Industries, Oane's AgProfessional, The Official Publication of ARA, CCA and NAICC, Nov. 2004 issue, p. 28.

* cited by examiner

*Primary Examiner*—James Keenan
(74) *Attorney, Agent, or Firm*—Nelson Mullins Riley & Scarborough, LLP

(57) ABSTRACT

A device for unloading a live floor bulk material hauling vehicle which includes a feeder that collects bulk material being dumped from the vehicle by action of the live floor and moves the material onto a conveyor. The conveyor accepts the material from the feeder and conveys it outwardly from the vehicle to a desired location. The conveyor is pivotably attached to the vehicle and can be pivoted to a first position whereby the vehicle can be unloaded by operation of the live floor and the conveyor, and a second position whereby the conveyor is displaced sufficiently from the vehicle that the vehicle can be unloaded by operation of the live floor without operation of the conveyor.

22 Claims, 11 Drawing Sheets

DEVICE FOR UNLOADING BULK MATERIAL FROM A LIVE-FLOOR VEHICLE

BACKGROUND OF THE INVENTION (1) Field of the Invention

The present invention relates to a device for unloading bulk material from a vehicle, and more particularly to a device for unloading bulk material from a live-floor vehicle.

(2) Description of the Related Art

Bulk material is known within the art as being any uncontained solid matter that has the capability of becoming airborne or creating fugitive dust. For example, bulk materials can include mulch, wood chips, dirt, sand, gravel, clippings, leaves, livestock feed, fertilizer, manure, hay, seed, compost, construction debris, plastic pellets or powders, grain, minerals, cement, gypsum, aggregate, clinker, gypsum, limestone, salt, coal, or soils.

A common piece of equipment used in the course of transporting bulk material is a live-floor trailer. These self-unloading trailers typically have a moving floor that can push bulk material contained within the vehicle toward some outlet on the trailer and out onto the ground.

Many live-floor systems utilize a series of hydraulically actuated floor slats and a drive unit. For example, the Walking Floor® is a live-floor system available from KEITH® Manufacturing, located in Madras, Oreg. In this system, the floor slats are horizontally-placed, moving in a forward-to-backward motion. The drive unit, which is usually mounted beneath the floor, powers the slats through a three-phase cycle to convey the material. In each of the first two phases, one-third of the slats move while the remaining two-thirds remain in place. During these two cycles, the bulk material does not move. In the final cycle, all the slats move together to convey the load toward the outlet, which is typically the rear of the vehicle.

U.S. Pat. No. 3,483,717 discloses a self-unloading trailer with an endless conveyor belt overlying the floor of the vehicle. The conveyor belt rides on the floor and is further supported and driven by a roller at each end of the trailer. Means are provided for turning the rollers in the same direction at the same speed. The endless conveyor belt allows the material within the trailer to be supported on the belt and transferred out of the trailer through the tailgate.

Another moving floor system consists of a series of slats connected to endless conveyor chains. The revolving floor system, discussed in U.S. Pat. No. 4,505,634 to Rezac, provides a flat bed trailer with the option of having either a live-floor configuration or a stationary configuration. If the live-floor is desired, the endless chains are rotated until the portion of the conveyor chains having the slats attached thereto is positioned over the top surface of the trailer bed. Material is then loaded onto the slats and the chains are rotated to empty the material from the vehicle. If the stationary floor is desired, the endless chains are rotated until the portion of the conveyor chains having the slats attached thereto is positioned along the bottom surface of the trailer bed.

While these systems are effective in moving bulk material toward the outlet of the transport vehicle and onto the ground, it is often necessary to convey the bulk material to a level that is higher than the outlet of the vehicle. Several devices have emerged which respond to that need.

For example, U.S. Pat. No. 2,609,115 to Oklehas discloses a self-unloading conveyor mechanism that is mounted to a truck. The truck has a tapered hopper body and a drag conveyor on its floor. The auxiliary discharge conveyor has a telescoping design.

U.S. Pat. No. 2,834,487 to Gaddis discloses a folding belt conveyor that is attached to a truck which has a tapered hopper body. The self-contained, mobile structure unloads and elevates bulk material.

U.S. Pat. No. 3,521,767 to Rossi describes a deployable belt conveyor for a cement mixer-type truck body. The conveyor can be rotated about a shifting vertical pivot axis and locked in place to deliver the material to the desired location.

U.S. Pat. No. 3,923,175 to Landvatter describes a hitch for a portable conveyor. The conveyor can be hitched to the back of a dump truck to accept material that is dumped into it and convey it upwardly and/or outwardly from the truck.

U.S. Pat. No. 4,072,242 to Cook describes a self-unloading forage wagon having a tailgate that is fitted with a conveyor mechanism that permits dumping of the load over the entire width of the bed when the tailgate is lowered.

U.S. Pat. No. 5,443,351 to Pettijohn discloses a mobile hydraulic conveyor that can be mounted on the back of a dump truck, for example, to accept material from the bed of the truck and convey it outwardly.

While these and other bulk material handling systems are useful and sufficient for many applications, a common disadvantage is that the only way to unload bulk material from the vehicle while the conveyor device is attached to the vehicle is through use of the conveyor. The prior art devices fail to provide a method for unloading the vehicle through use of the live floor alone, without actual use of the conveyor device. The prior art devices must be physically removed from the frame of the vehicle in order to unload the vehicle solely by use of the live-floor.

Removing the device from the vehicle requires a significant time commitment and requires certain tools, equipment, and manpower to aid in the removal. This can become a significant impediment if the vehicle is required to drive to several locations, using the conveyor to elevate and convey material in some of those locations and using the live floor to dump material in other locations. Accordingly, there remains a need for an unloading device for a live-floor vehicle, wherein the device will allow the bulk contents of the vehicle to be unloaded via an attached conveyor belt or via the live floor alone, without having to remove the device from the vehicle.

SUMMARY OF THE INVENTION

Briefly, therefore, the present invention is directed to a novel device for unloading bulk material from a live floor bulk material hauling vehicle, the device comprising:
    at least one feeder that moves bulk material being dumped from the vehicle by action of the live floor onto
    a conveyor that accepts the material from one or more feeders and conveys it outwardly from the vehicle to a desired location; where the conveyor is pivotably attached to the vehicle and can be pivoted to a first position whereby bulk material can be unloaded from the vehicle by operation of the live floor and the conveyor, and a second position whereby the conveyor is displaced sufficiently from the vehicle that bulk material can be unloaded from the vehicle by operation of the live floor without operation of the conveyor.

The present invention is also directed to a novel bulk material hauling vehicle having attached thereto an unloading device according to the device described just above.

The present invention is also directed to a novel device for unloading bulk material from a live floor vehicle, the device comprising:

a pivoting frame that is attachable to the vehicle, wherein the pivoting frame can be pivoted to:
   a first position which permits the vehicle to be emptied by operation of the live floor and a conveyor which is attached to the pivoting frame; and
   a second position which displaces the conveyor away from the vehicle and permits the vehicle to be emptied by operation of the live floor alone; and
at least one feeder that receives bulk material that is discharged by the live floor and feeds the material onto the conveyor.

Among the several advantages achieved by the present invention, it allows a live-floor bulk vehicle to be emptied via an attached conveyor belt or the live floor alone, without the necessity of removing the device from the vehicle to utilize the live floor. This eliminates the time, equipment, tools, and manpower that would be necessary to dismantle a similar unloading device in order to empty the vehicle via the live floor alone. Thus, the vehicle would be able to travel to several locations, using the conveyor to elevate and convey materials in some locations and using the live floor to dump materials in other locations, all without the necessity of removing the device from the vehicle.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
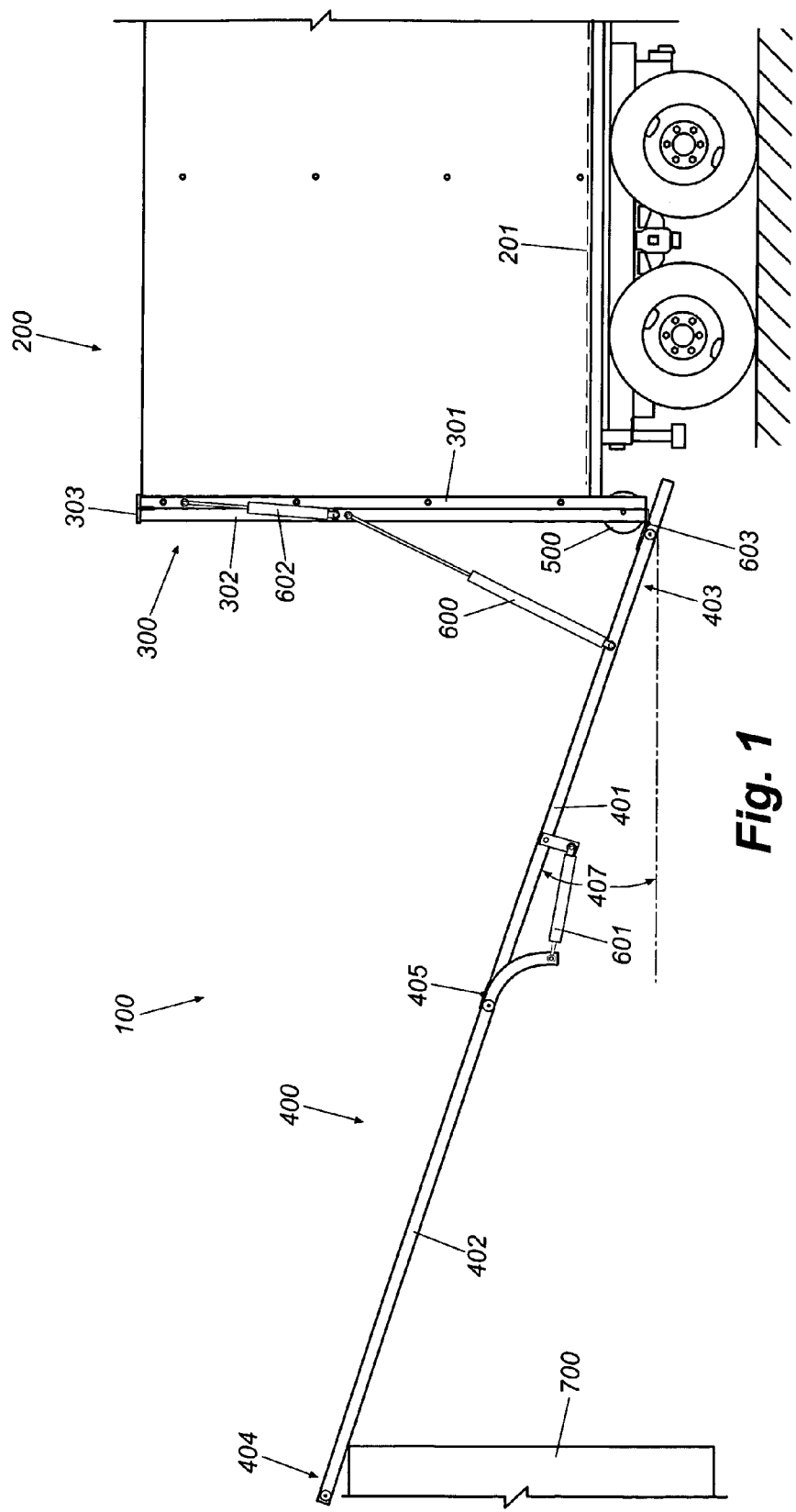
FIG. 1 is a side view of a device of the present invention having a pivoting frame, where the pivoting frame is in the first position and the conveyor is fully extended.

In accordance with the present invention, a novel device for unloading bulk material from a live-floor vehicle has been discovered. The device includes at least one feeding device, the first of which can be located near, and usually just below, the outlet of a live floor vehicle. This first feeder is designed to collect the bulk material being dumped from the vehicle by action of the live floor. This feeder can move the bulk material onto a conveyor that accepts the material and conveys it outwardly from the vehicle to a desired location. Optionally, this feeder can center the bulk material for convenience of feeding onto the conveyor.

In a particular embodiment, one or more additional feeders may be present at various heights near the outlet of the vehicle. Preferably, these feeders break up the bulk material, allowing it to feed at a continuous rate onto to the conveyor. These additional feeders can, for example, be present at two varying heights near the outlet of the vehicle. The third feeder, located at the highest level, can break up and move the bulk material toward a second feeder located below it. The second feeder can then break up and move the bulk material toward the first feeder, located below it. The first feeder can then move the bulk material onto the conveyor.

The conveyor is pivotably attached to the vehicle and can be pivoted to a first position whereby bulk material can be unloaded from the vehicle by operation of the live floor and the conveyor. In the first position, the feed end of the conveyor is located near, and often slightly below, the exit port of the first feeder, so that bulk material that is moved by the feeder falls out of the exit port and onto the feed end of the conveyor. The conveyor can also be pivoted to a second position whereby the conveyor is displaced sufficiently from the vehicle that bulk material can be unloaded from the vehicle by operation of the live floor without operation of the conveyor.

Another feature of the present device is that the conveyor is pivotably attached to the vehicle so that it can be raised to an inclined position, whereby the discharge end of the conveyor is at a height that is significantly above the location of the normal discharge level of the live-floor vehicle. This permits the present device to be used to fill other bulk hauling vehicles, such as bulk hauling trailers, or hopper bodies on bulk material spreading trucks.

When the present device is attached to a bulk material hauling trailer, such as a reciprocating slat type trailer, the trailer can be used to haul bulk material from a source to a bulk-material spreading truck, such as a mulch spreading truck. When the spreading truck is in operation and spreading mulch, it is inefficient for it to stop the spreading operation and return to the source of the mulch for re-filling. With the present device, the mulch spreading truck can remain at the job site and can spread mulch continuously, while the bulk material hauling trailer is filled at the source of the mulch, drives to the spreading truck, and uses the present device to transfer mulch into the hopper body of the spreading truck—without interrupting the operation of the spreading truck in distributing mulch. When it is necessary to change the type of mulch in the trailer, or to empty any mulch remaining in the trailer, the present device can be pivoted to a second position to permit emptying the bulk material hauling trailer by operation of the live floor alone.

The present unloading device is useful for unloading and conveying any type of bulk material from a vehicle. Examples of bulk materials that can be unloaded and conveyed by the present invention include mulch, wood chips, dirt, sand, gravel, clippings, leaves, livestock feed, fertilizer, manure, hay, seed, compost, construction debris, plastic pellets or powders, grain, minerals, cement, gypsum, aggregate, clinker, gypsum, limestone, salt, coal, soils, or mixtures of any of these.

As used herein, the terms "live-floor vehicle" or "live floor bulk material hauling vehicle" include any vehicle that can contain bulk material and can be unloaded without physical assistance from auxiliary equipment or personnel, but such vehicles are not meant to include dump trucks or dumping trailers for the purposes of this application. Live floors can also be referred to as "live bottoms", "moving floors" or "walking floors". Examples of live floors include conveyor belt systems, slat and chain systems, or moving slats systems. As used herein, the terms "moving slat system" refer to a system which utilizes horizontally-placed, moving floor slats to move the load toward the outlet of the vehicle. Typically a moving slat system is hydraulically operated and has a three or four phase cycle, in which the load moves toward the outlet of the vehicle during at least one phase of each cycle.

An embodiment of the present unloading device can be described by referring to the drawings that are a part of this specification. It should be understood that the drawings are exemplary and are not meant to, and are not to be construed to, limit the scope of the present invention to the features that are shown in the drawings.

The present unloading device 100 can be mounted onto any suitable vehicle 200, a trailer chassis being illustrated in the present instance. Preferably, the body of the vehicle 200 is of generally rectangular or box-like construction. In a particular embodiment of the invention, the vehicle 200 has a front end and a rear end, and the output location of the vehicle 200 is located at the rear end. In this embodiment, the rear end of the vehicle 200 has two sides, a bottom and an open top. The open top allows loading of the vehicle 200 through the top, if preferred. In another embodiment of the invention, the vehicle 200 may have an enclosed top. The vehicle 200 has a live floor 201 which, in normal operation, can move bulk material that is contained within the vehicle 200 toward the output location of the vehicle 200 and out onto the ground.

In this embodiment, a pivoting frame 300 is preferably mounted on the rear of the vehicle 200. The pivoting frame may be mounted on the sides, bottom, or top of the rear of the vehicle 200. Though the pivoting frame 300 is attached to the rear of the vehicle 200 in this embodiment, the pivoting frame 300 can be mounted on any output location on the vehicle 200. The pivoting frame 300 can be releasably attached to the vehicle 200, such as with bolts, screws, clamps and the like.

The pivoting frame 300 is comprised of a fixed portion 301 and a pivoting portion 302. The fixed portion 301 can be attached to the rear end of the vehicle 200. The pivoting portion 302 can be attached to the fixed portion 301 by a hinge 303. In one embodiment, the fixed portion 301 and the pivoting portion 302 are pivotably attached at the top of the pivoting frame 300 by a hinge 303 (shown in FIGS. 1-6).

As shown in the figures, the pivoting frame 300 can pivot to at least two positions via movement of the pivoting portion 302. A frame pivot drive mechanism 602 can be attached to the fixed portion 301 and the pivoting portion 302 (shown in FIGS. 1-6). When the frame pivot drive mechanism 602 is activated, the pivoting portion 302 pivots away from the fixed portion 301. The frame pivot drive mechanism 602 permits the pivoting frame 300 to pivot between positions.

Preferably, the frame pivot drive mechanism 602 is a hydraulic mechanism, pneumatic mechanism, electric mechanism, magnetic mechanism, mechanical mechanism or a combination thereof. For example, the frame pivot drive mechanism 602 can be electric screw drive mechanisms or servo-electric screw drive mechanisms. Preferably, the drive mechanism 602 has a control device that is mounted inside the cab of the vehicle 200 to permit adjustment of the device 100 by the operator of the vehicle.

Figure 2:
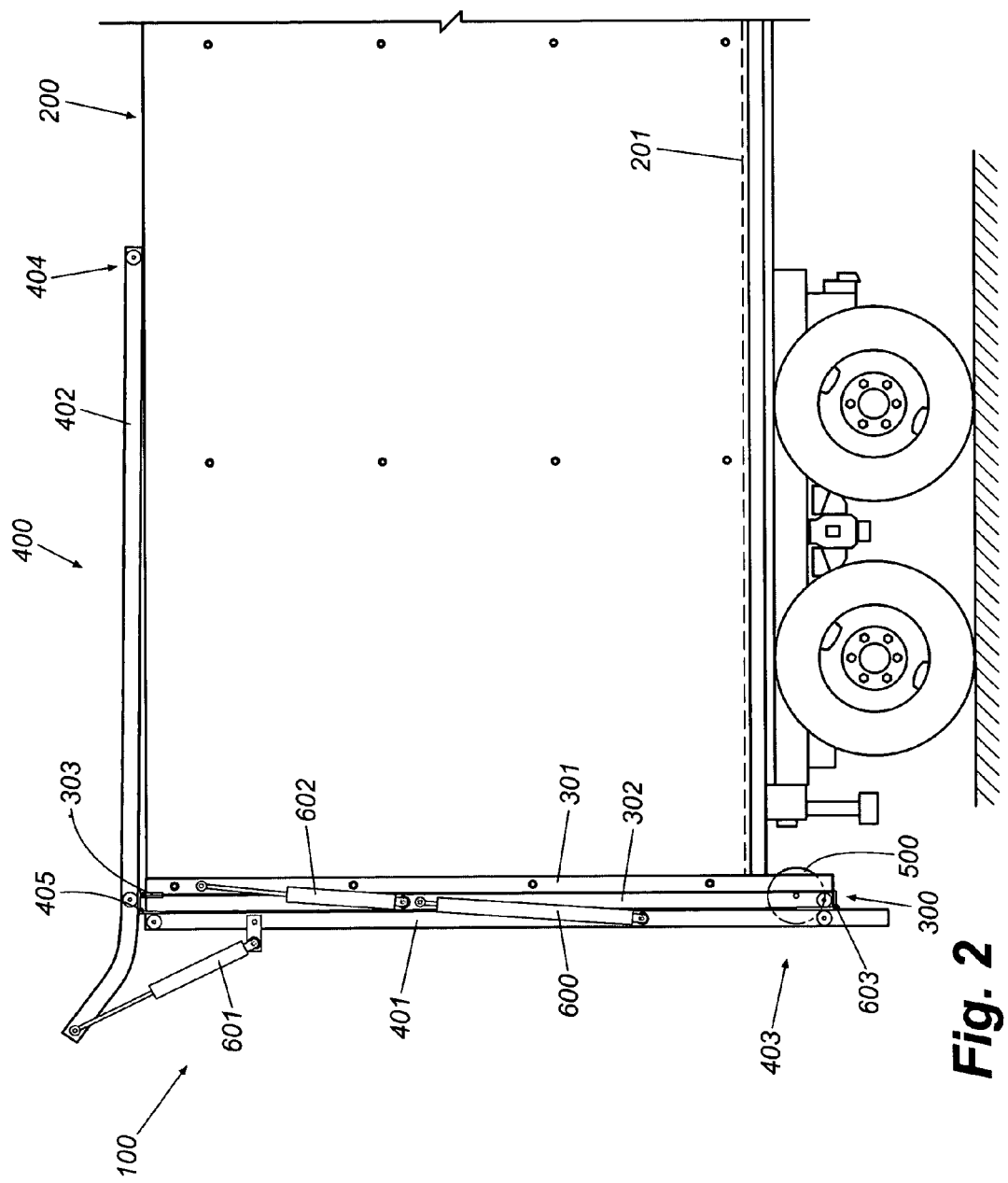
FIG. 2 is a side view of a device of the present invention where the pivoting frame is in the first position and the conveyer is stowed.
Figure 3:
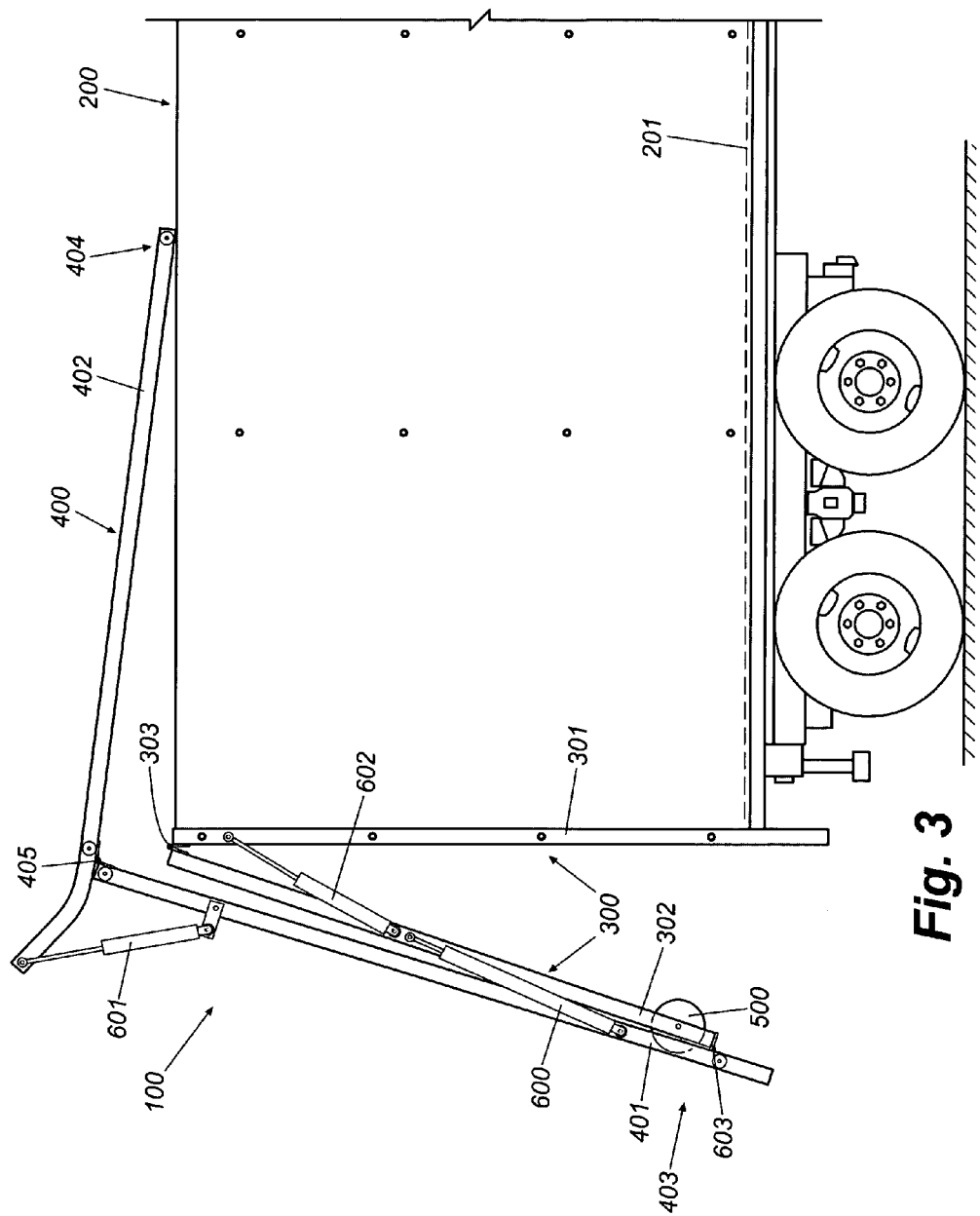
FIG. 3 is a side view of a device of the present invention where the pivoting frame is in the second position and the conveyor is displaced to permit unloading of the vehicle by operation of the live floor.

If the pivoting portion 302 and the fixed portion 301 are connected by a hinge 303 at the top of the pivoting frame 300 (as shown in FIGS. 1-6), it is preferable that the pivoting portion 302 of the pivoting frame 300 pivot away from the fixed portion 301 in a vertical plane (shown in FIG. 3). This position should be sufficient to allow the bulk material to be unloaded from the vehicle 200 by operation of the live-floor 201 without operation of the conveyor 400.

Figure 5:
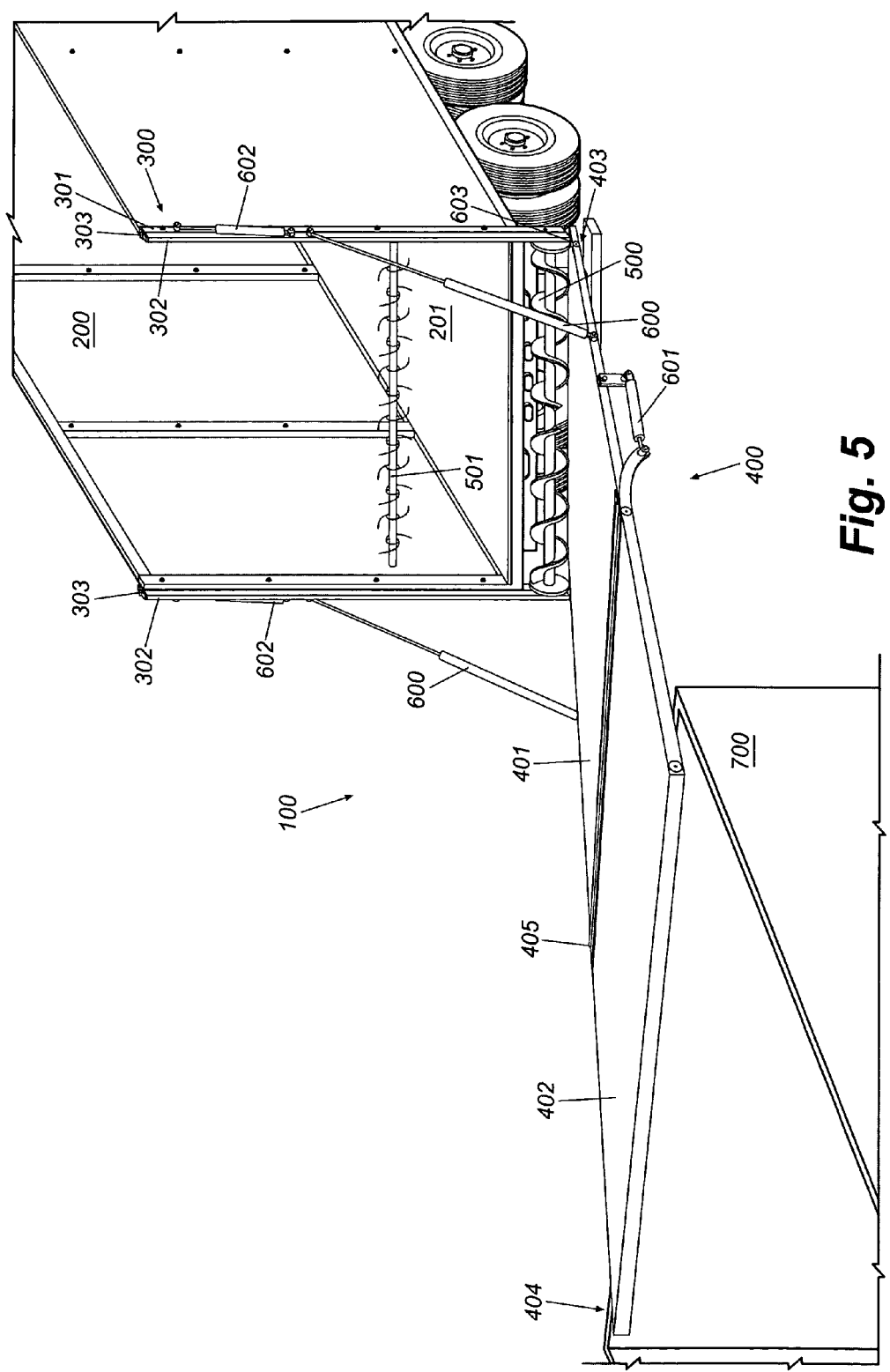
FIG. 5 is an alternative embodiment of a device of the present invention when the pivoting frame is in the first position and the conveyor is fully extended, this embodiment illustrating a device having two feeders.
Figure 6:
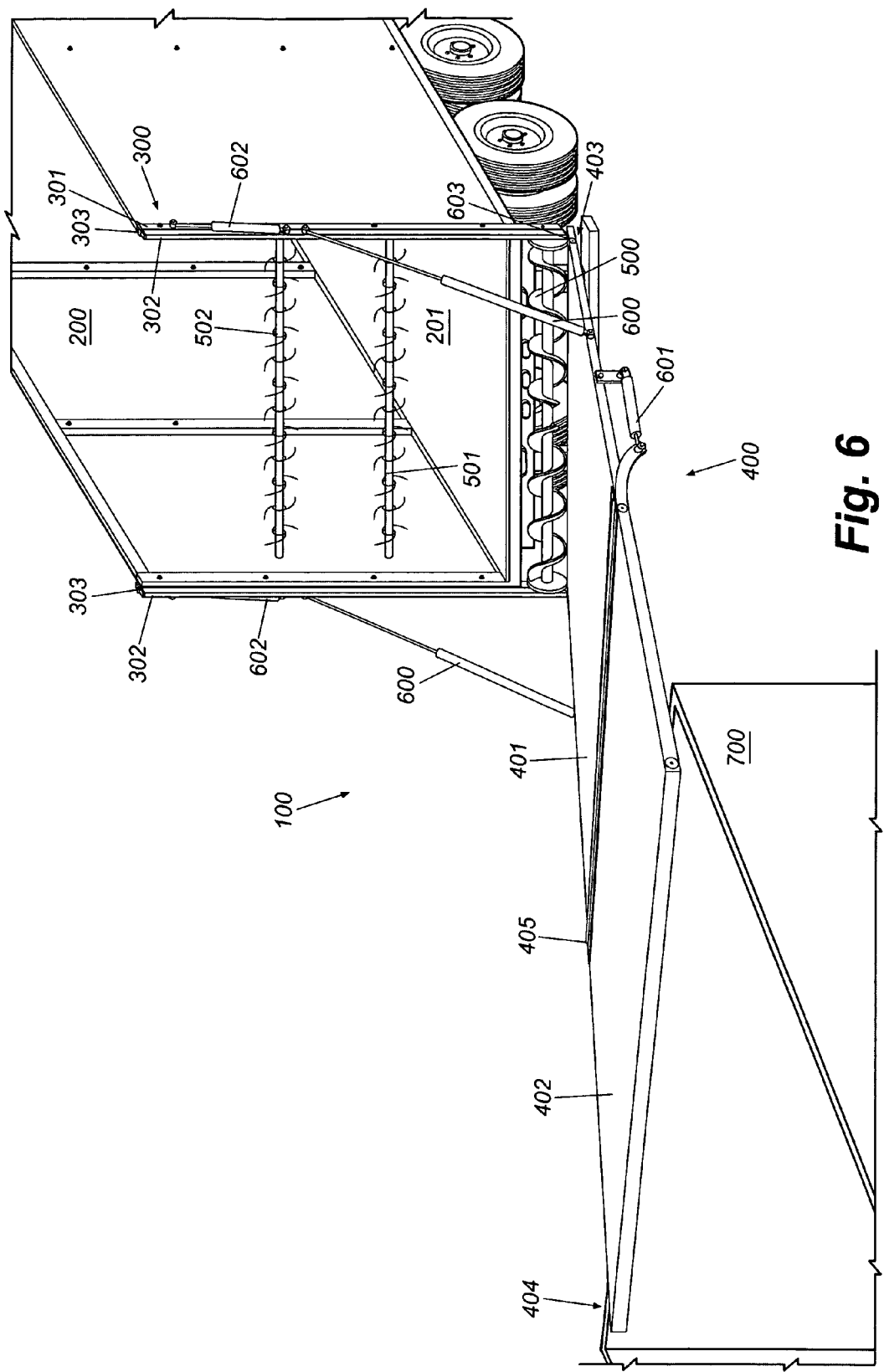
FIG. 6 is an alternative embodiment of a device of the present invention when the pivoting frame is in the first position and the conveyor is fully extended, this embodiment illustrating a device having three feeders.
Figure 7:
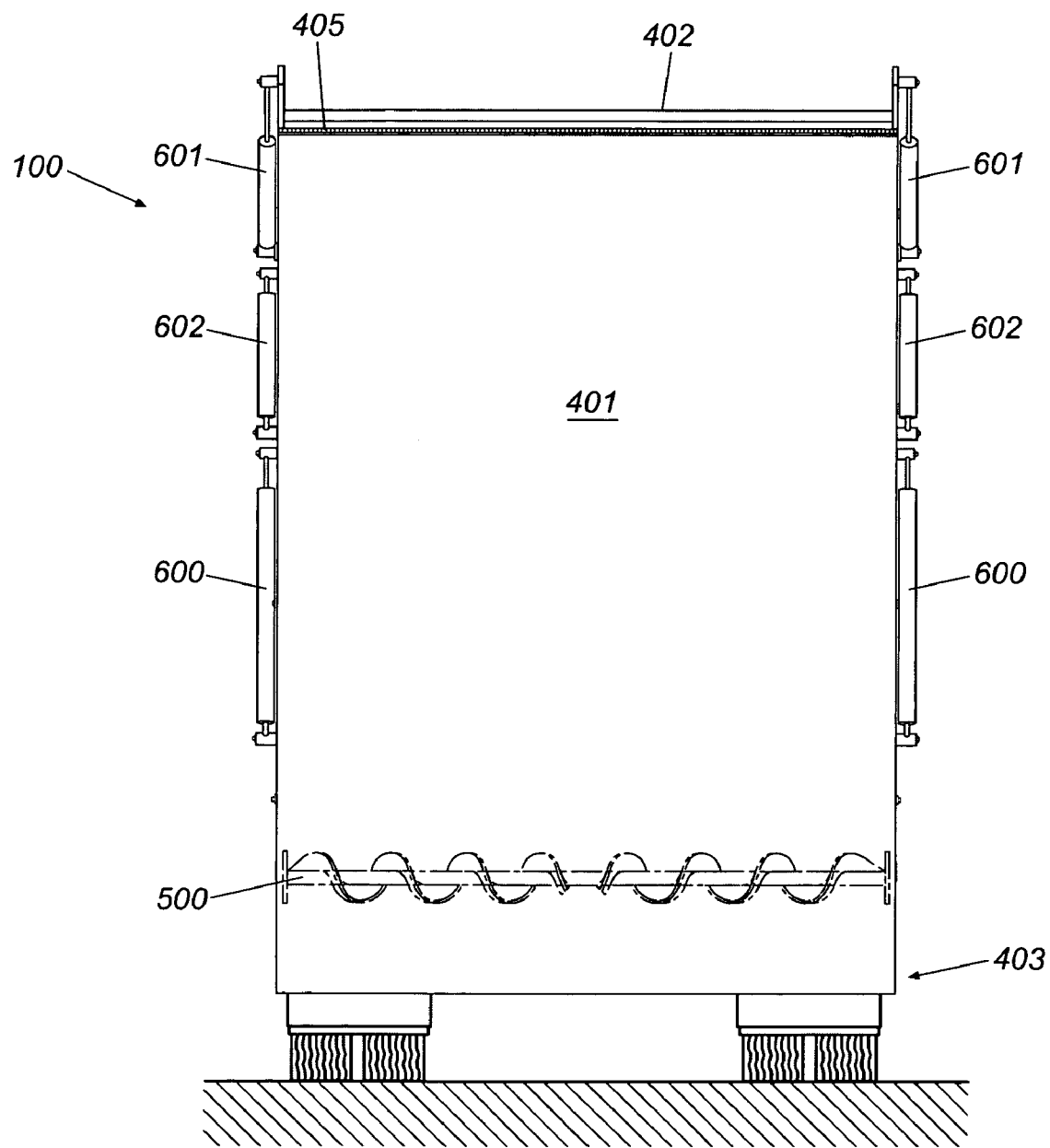
FIG. 7 is a rear view of a device of the present invention when the pivoting frame is in the first position and the conveyor is stowed.

It is preferable that the pivoting frame pivot to at least two positions. FIGS. 1 and 4-6 show the pivoting frame 300 in the first position, in which the fixed portion 301 and the pivoting portion 302 are immediately adjacent to each other. This position allows the bulk trailer to be emptied by operation of the live floor 201 and the conveyor 400, which is attached to the pivoting frame 300. The first position of the pivoting frame 300 also permits the conveyor 400 to be stowed for travel, as shown in FIGS. 2 and 7.

Figure 8:
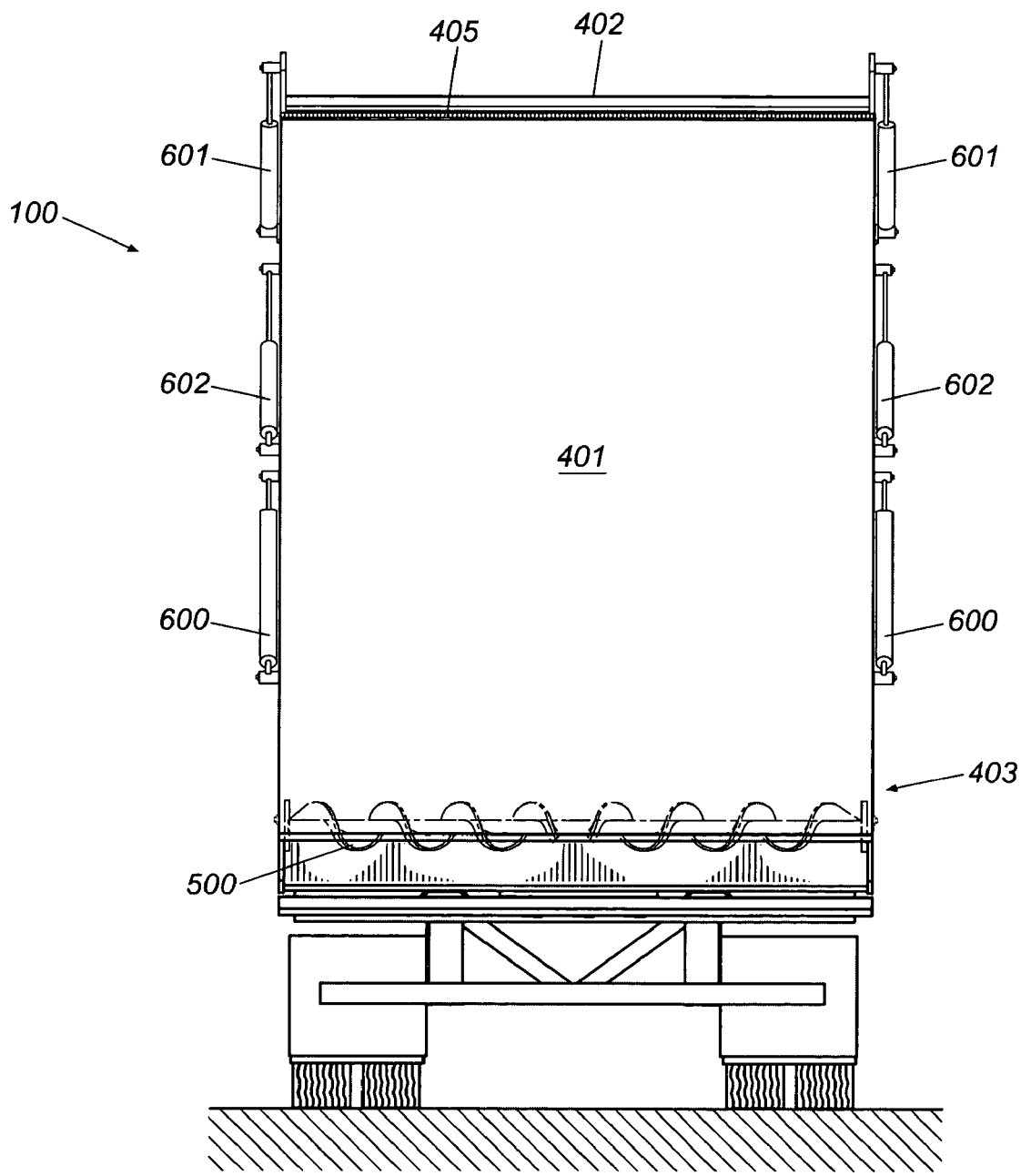
FIG. 8 is a rear view of a device of the present invention when the pivoting frame is in the second position and the conveyor is displaced for unloading of the vehicle by operation of the live floor.

FIGS. 3 and 8 illustrate the second position of the pivoting frame 300. In the second position, the pivoting portion 302 is pivoted away from the fixed portion 301. The second position displaces the conveyor 400 and permits the vehicle 200 to be emptied by operation of the live floor 201 alone.

The conveyor 400 of the present invention has a feed end 403 and a discharge end 404. The conveyor 400 is generally comprised of two structural members, one being an attached structural member 401 and the other being a foldable structural member 402. The structural members provide a rigid structural support for the conveyor 400. The attached structural member 401 attaches to the base of the pivoting portion 302 of the pivoting frame 300 at the feed end 403. Preferably a hinge mechanism 603 connects the feed end 403 of attached structural member 401 and the base of the pivoting portion 302. The foldable structural member 402 is attached at one end to the attached structural member 401 and terminates at the discharge end 404 of the conveyor 400.

Preferably, the foldable structural member 402 attaches to the attached structural member 401 by means of a hinged mechanism 405 at some point between the feed end 403 and the discharge end 404. Preferably, the length of the attached structural member 401 comprises approximately one third of the length of the conveyor 400 and the foldable structural member 402 comprises about two thirds of the length of the conveyor 400. In this embodiment, the hinged mechanism 405 is located at a position that is approximately one third of the length of the conveyor 400, measured from the feed end 403. In another preferred embodiment, the attached structural member 401 and the foldable structural member 402 are hinged at a location that permits the conveyor 400 to be stowed for travel. In this embodiment, the attached structural member 401 should be at least as long as the output location of the vehicle 200. In order for the conveyor 400 to be stowed for travel, the foldable structural member 402 should fold onto the top of the vehicle 200 while the attached structural member 401 covers the rear of the vehicle 200.

The conveyor 400 can be any type of conveyor known in the art, such as a drag, apron, bucket, chain, flight, slats, wheel, towline, trolley, pneumatic, roller, screw, auger or belt conveyor. In a preferred embodiment, the conveyor 400 is a belt conveyor. If the conveyor 400 is a belt conveyor, the belt can be made out of any material known in the art to be effective in conveying bulk material. For example, the belt may be made of plastic, cotton, nylon, polypropylene, polyurethane, polyvinylchloride, or rubber.

The conveyor 400 may comprise other conventional conveyor parts, such as control units, drive units, gear boxes, motor mounts, shims, guards, couplings and the like. These parts can include any known in the art to be used in conjunction with conveyor systems. For example, the drive unit may be a drum motor drive system, beltless screw drive system, caterpillar drive system, sprocket-type drive system, unit-floating drive system or a friction-driven drive system. The gear box or unit may be an in-line gear, parallel shaft, right angle, worm, planetary or bevel helical gear unit. The control unit, drive unit and gear box may be mounted onto the vehicle 200 in any location that would be convenient for the user.

Preferably, the speed of the conveyor is controllable. In one embodiment, the conveyor system has an electrical variable speed controller. Additionally, it would preferable if the conveyor system has a start-up warning signal, emergency shut-down capabilities and overload shut-down protection.

The conveyor 400 is preferably at least 12 inches wide. More preferably, the conveyor 400 is at least 36 inches wide. Even more preferred, the conveyor 400 is approximately 60 inches wide. In a particular embodiment, the conveyor 400 is about the same width as the vehicle 200. In this embodiment, the conveyor 400 can serve as a barrier for preventing the spillage of bulk materials when the conveyor 400 is in a stowed position. Additionally, the bulk materials are less likely to fall off the sides of the conveyor 400 during use in the fully extended position if the conveyor 400 is about the same width as the vehicle 200 itself.

Figure 4:
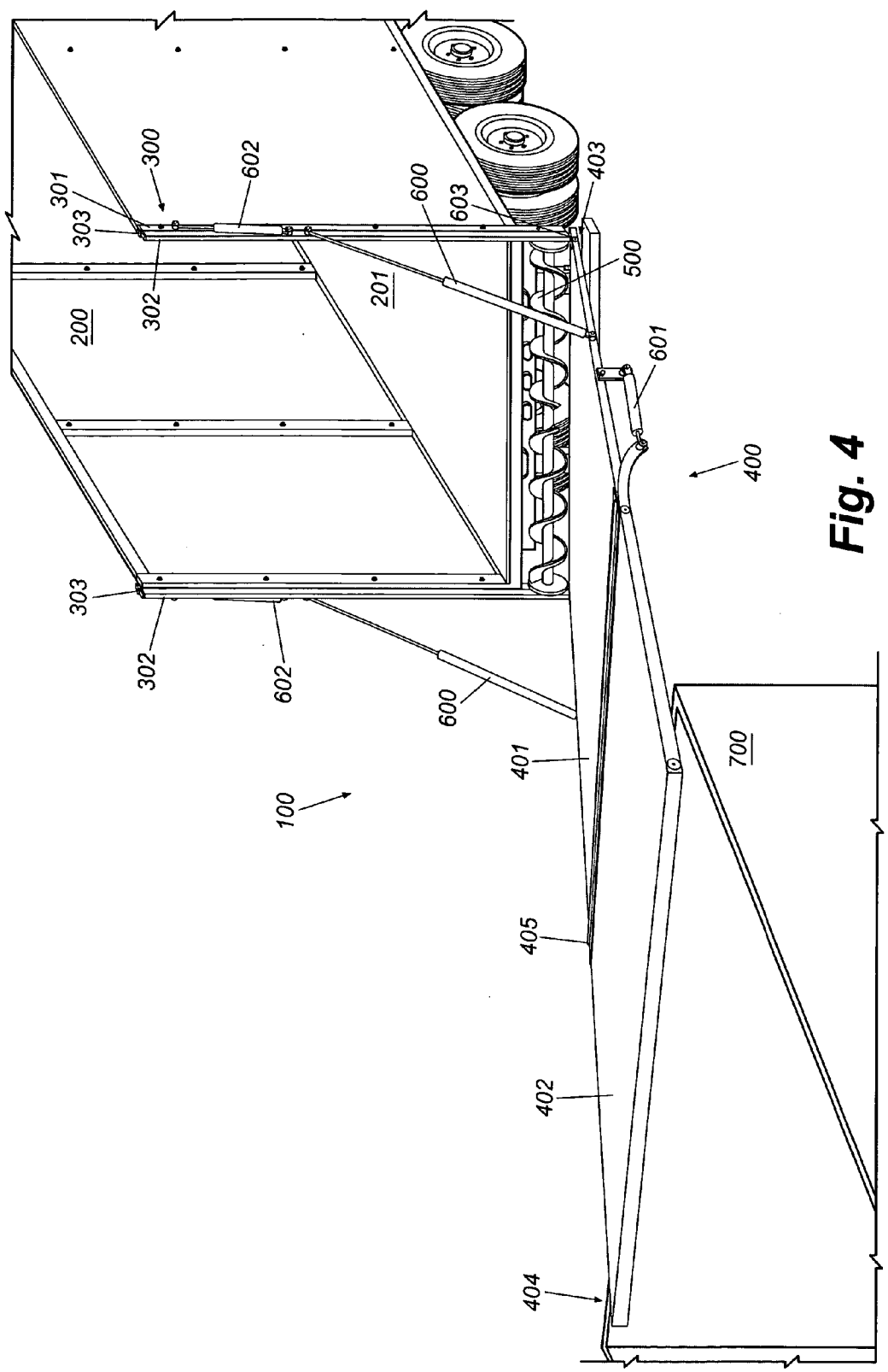
FIG. 4 is a perspective view of a device of the present invention when the pivoting frame is in the first position and the conveyor is fully extended.
Figure 4A:
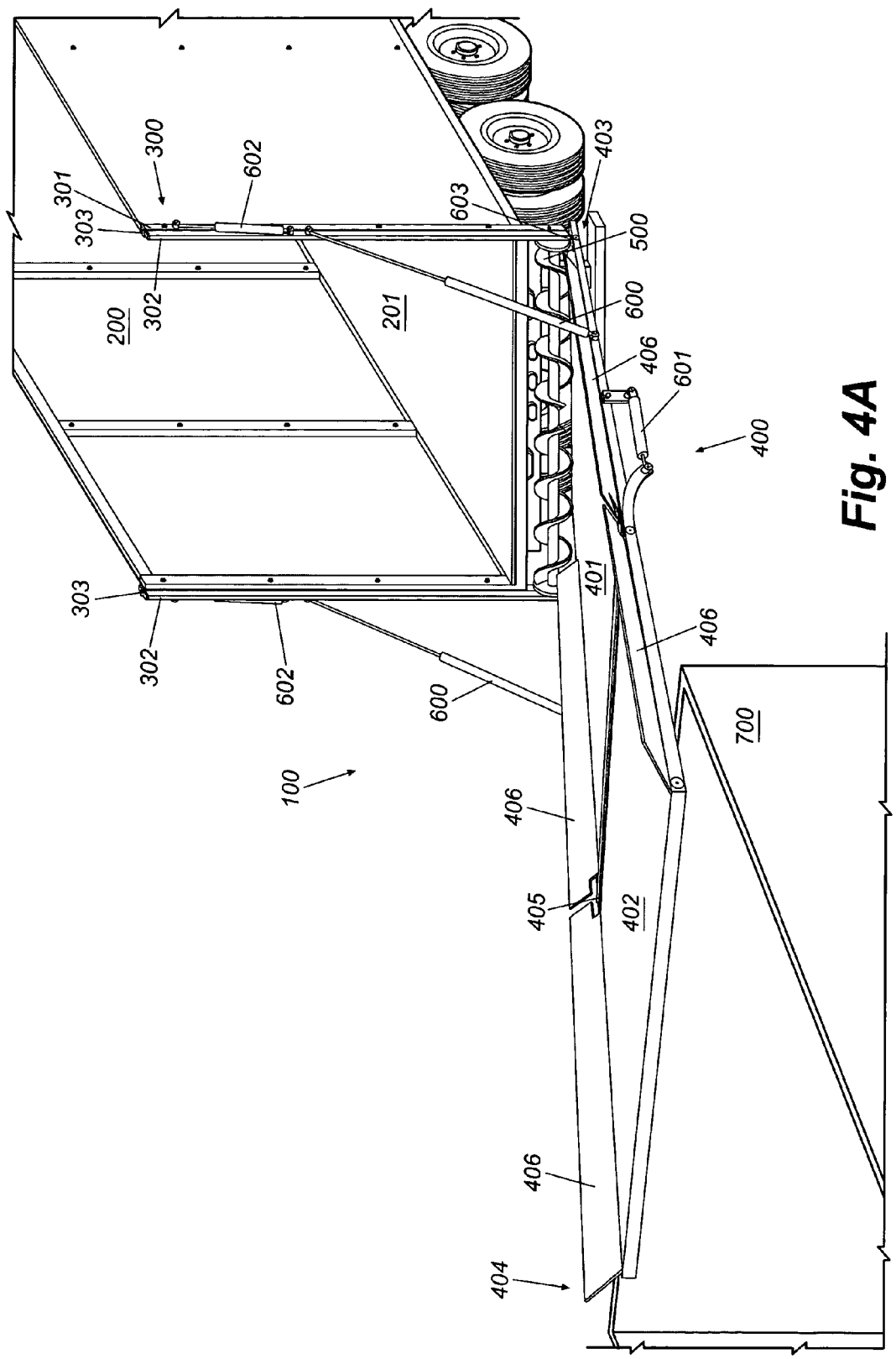
FIG. 4A is an alternate embodiment of a device of the present invention in which the conveyor has side walls sloping inward toward the conveyor.

In one embodiment, the conveyor 400 can be V-shaped to prevent bulk material from falling off the edge of the conveyor 400 as the material is being conveyed. In another embodiment, the conveyor 400 has side walls 406 that prevent bulk material from falling off the edge of the conveyor 400 as the material is being conveyed (shown in FIG. 4a). Preferably, the side walls 406 are sloped at an angle toward the conveyor 400 in order to prevent bulk material from falling off the edge of the conveyor 400 as the material is being conveyed.

In FIGS. 1 and 4-6, the conveyor 400 is in a fully extended position. In the fully extended position, it is preferred that the conveyor 400 extend laterally away from the vehicle 200. It is also preferred that when the conveyor 400 is in its fully extended position, the conveyor 400 is inclined. Preferably, the conveyor 400 has a hinged mounting at the feed end 403 that permits the conveyor 400 to be inclined so that the discharge end 404 is higher than the feed end 403.

When the conveyor 400 is inclined, the angle 407 between the feed end 403 and the discharge end 404 is preferably no greater than 36°. More preferred, the angle 407 between the feed end 403 and the discharge end 404 is no greater than 18°. It is preferred that the length of the conveyor 400 is sufficient to permit elevation of the discharge end 404 to a point that is 10 feet above the level of the feed end 403 without the conveyor 400 exceeding an angle 407 of 18°. In a preferred embodiment of the device, the conveyor 400 transports bulk material to a height sufficient to feed the material into the hopper body of an adjacent vehicle or depository 700.

In FIGS. 2 and 7, the conveyor 400 is in a stowed position. In the stowed position, the attached structural member 401 is positioned adjacent to the pivoting portion 302, which, in turn, is immediately adjacent to the fixed portion 301 of the pivoting frame 300. In the stowed position, the folding structural member 402 is folded at approximately a 90° angle from the attached structural member 401 and is adjacent to the top of the vehicle 200. Preferably, this position allows the device 100 to comply with any highway regulations mandating the maximum height of vehicles. Because the device 100 is adjacent to the rear and top of the vehicle 200 in this position, it does not unduly increase the height of the vehicle 200 and thus the device will not violate any maximum height requirements.

In FIGS. 3 and 8, the conveyor 400 is in a displaced position. In the displaced position, the attached structural member 401 is again positioned immediately adjacent to the pivoting portion 302, however, in this configuration, the pivoting portion 302 is pivoted away from the fixed portion 301. In FIGS. 3 and 8, the folding structural member 402 is folded and is adjacent to the top of the vehicle 200.

In the displaced position, the conveyor 400 can be displaced away from the normal unloading port of the live-floor vehicle 200 so that it does not interfere with unloading of bulk material from the vehicle 200 by operation of the live-floor 201. In other words, the conveyor 400 is in a position that does not obstruct the movement of the bulk material as it is unloaded from the vehicle 200 by operation of the live floor 201. This is to be distinguished from a practice of merely turning off the conveyor 400 while allowing the live floor mechanism 201 to operate, whereby bulk materials being fed onto the conveyor simply overflow the conveyor 400 and fall onto the ground. Such a practice is not as useful as the operation of the present invention, because the obstruction provided by the conveyor 400 to the free discharge of the bulk material from the vehicle 200 can cause jamming of the flow of the material. Additionally, such a practice requires cleaning the conveyor 400 of residual bulk material after the discharge is completed. The present invention avoids this delay.

In an embodiment of the present invention, two drive mechanisms, 600 and 601, permit the movement of the conveyor 400 between the stowed and fully extended position. The first drive mechanism 600 allows the attached structural member 401 to move into the fully extended position and controls the overall angular position of the conveyor 400. In a preferred embodiment, a first drive mechanism 600 is affixed to the attached structural member 401 and a the pivoting frame 300. The first drive mechanism 600 may be attached to either the fixed portion 301 or the pivoting portion 302 of the pivoting frame 300. Thus, the first drive mechanism 600 may connect the attached structural member 401 to either the fixed portion 301 or the pivoting portion 302.

FIGS. 1-6 show an embodiment in which the first drive mechanism 600 connects the attached structural member 401 to the pivoting portion 302 of the pivoting frame 300.

Figure 1A:
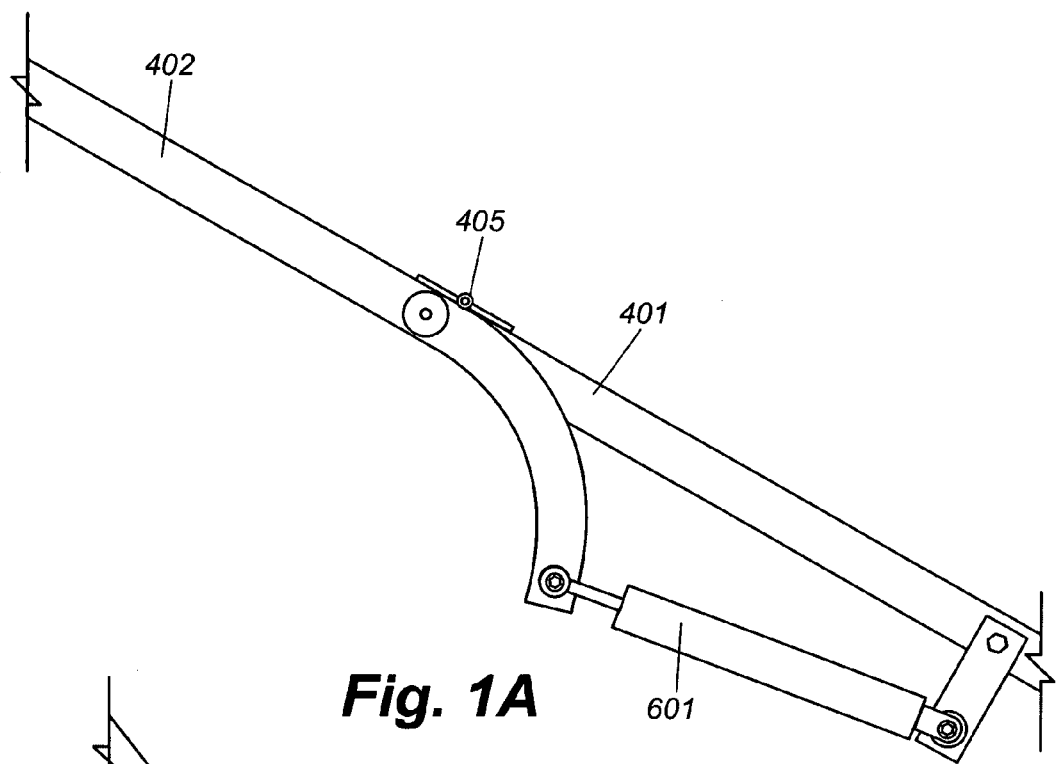
FIG. 1A is an exploded view of a hinge and pivoting mechanism, which connects the two sections of the conveyor, in the fully extended position.
Figure 1B:
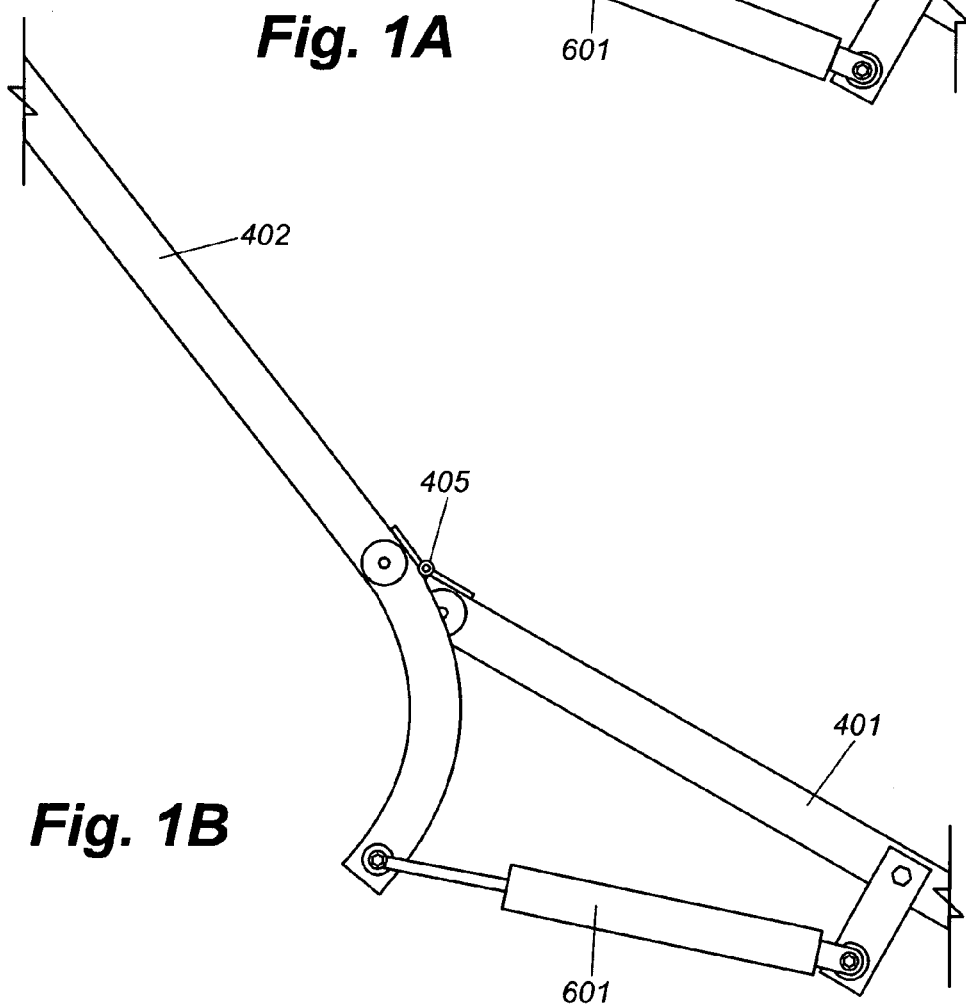
FIG. 1B is an exploded view of a hinge and pivoting mechanism, which connects the two sections of the conveyor, moving into the stowed position.

Preferably, a second drive mechanism 601 is affixed to the attached structural member 401 and the folding structural member 402. This mechanism permits the folding structural member 402 to open into the fully extended position and fold into the stowed position. In an embodiment, the folding structural member 402 curves slightly away from the conveyor 400 just beyond the point at which the attached 401 and folding 402 structural members meet and are hinged 405. The second drive mechanism 601 can be affixed to the curved portion of the folding structural member 402 and the attached structural member 401. This embodiment allows the folding structural member 402 to lay substantially flush against the top of the vehicle 200 when the invention is in the stowed position. An exploded view of drive mechanism 601 is shown in FIGS. 1a and 1b. Drive mechanisms 600 and 601 can be any mechanism that will cause the conveyor 400 to move between the stowed position and the fully extended position.

Preferably, drive mechanisms 600 and 601 are hydraulic mechanisms, pneumatic mechanisms, electric mechanisms, magnetic mechanisms, mechanical mechanisms or a combination thereof. For example, the drive mechanisms 600 and 601 can be electric screw drive mechanisms or servo-electric screw drive mechanisms. Preferably, the drive mechanisms 600 and 601 have a control device that is mounted inside the cab of the vehicle 200 to permit adjustment of the device 100 by the operator of the vehicle.

In one embodiment of the invention, a first feeder 500 is fixedly attached to the base of the pivoting frame 300. This feeder 500 is shown in FIGS. 1, 2 and 3 as being attached to the pivoting portion 302 of the pivoting frame 300. In another embodiment, however, the feeder 500 could be attached to the fixed portion 301 of the pivoting frame 300.

When the pivoting frame 300 is in the first position, the first feeder 500 is positioned just below the rear base wall of the vehicle 200. This feeder 500 is positioned so that it can receive bulk material discharged by the live floor 201, preferably move the material toward the center of the device, and feed the material at a regular rate onto the conveyor 400. This feeder 500 can be a counter-flight screw conveyor, a two screw conveyor, a fluffing bar with a tapered chute, a centering conveyor, or any other feeder known in the art. In one embodiment, the feeder 500 has a removable cover which protects it while the vehicle 200 is traveling.

When the pivoting frame 300 is in the second position and the feeder 500 is attached to the pivoting portion 302, shown in FIGS. 3 and 8, both the conveyor 400 and the feeder 500 are displaced, allowing the bulk material to be emptied from the vehicle 200 by means of the live floor 201 alone.

Alternatively, the feeder 500 can be attached to the fixed portion 301 of the pivoting frame 300. In this embodiment, the feeder 500 is not displaced when the pivoting frame 300 is in the second position. Thus, the bulk material can be emptied from the vehicle 200 by means of the live floor 201 and the feeder 500.

Optionally, the invention comprises a second feeder 501 located near the rear of the vehicle 200, above the first feeder. The second feeder 501 may be any type of feeder effective in breaking up bulk material and moving it downward toward the first feeder 500. For example, the second feeder 501 can be a counter-flight screw, two screw, beater, barbed bar, or fluffing bar. Preferably, the second feeder 501 has barbs or fingers that rotate in order to fragment or crumble the bulk materials. An embodiment of the second feeder 501 is shown in FIG. 5.

In another embodiment of the invention, a third feeder 502 is located near the rear of the vehicle 200, above the second feeder 501. The third feeder 502 may be any type of feeder effective in breaking up bulk material and moving it downward toward the second feeder 501. For example, the third feeder 502 can be a counter-flight screw, two screw, beater, barbed bar, or fluffing bar. Preferably, the third feeder 502 has barbs or fingers that rotate in order to fragment or crumble the bulk materials. An embodiment of the third feeder 502 is shown in FIG. 6.

The feeders may comprise other conventional feeder parts, such as control units, drive units, gear boxes, motor mounts, shims, guards, couplings and the like. These parts can be any known in the art to be used in conjunction with feeder systems. For example, the drive unit may be a drum motor drive system, beltless screw drive system, caterpillar drive system, sprocket-type drive system, unit-floating drive system or a friction-driven drive system. The gear box or unit may be an in-line gear, parallel shaft, right angle, worm, planetary or bevel helical gear unit. The control unit, drive unit and gear box may be mounted onto the vehicle 200 in any location that would be convenient for the user. Preferably, the control unit is located in the cab of the vehicle 200.

Figure 9:
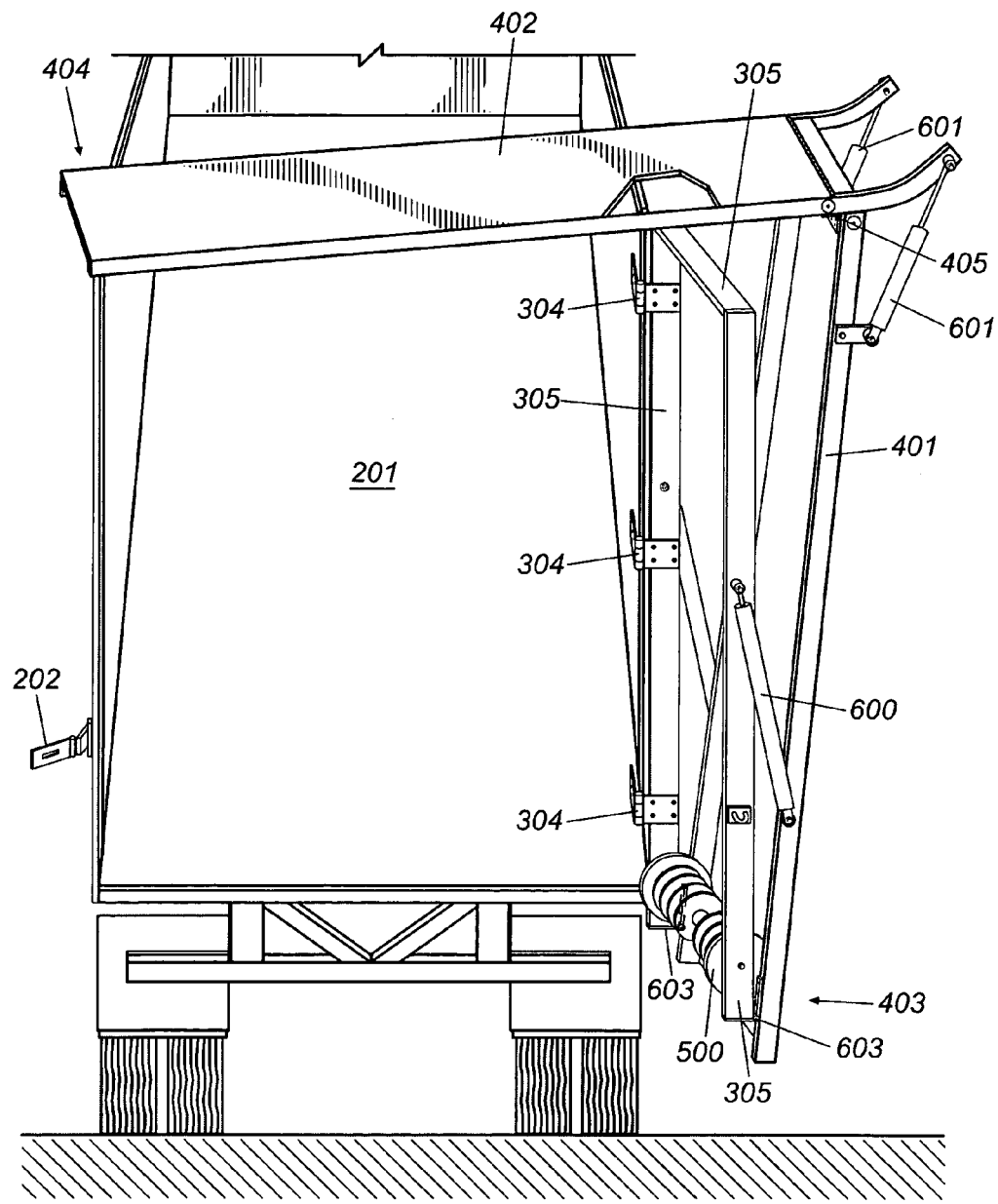
FIG. 9 is a perspective view of an alternate embodiment of the present invention in the second position, pivoting horizontally, with the conveyor displaced to permit unloading of the vehicle by operation of the live floor.

FIG. 9 illustrates an alternate embodiment of the device 100. In this embodiment, the pivoting frame is comprised of hinged portion 305. Hinged portion 305 is comprised of two vertical supports and a horizontal support connecting the top of the two vertical supports. Feeder 500 connects the bottom of the two vertical supports. Hinged portion 305 is hingedly attached 304 along a side wall of the rear of the vehicle 200. In FIG. 9, the hinged portion 305 pivots horizontally away from the vehicle 200. In this embodiment, the hinged portion 305 may pivot to the left or to the right of the vehicle 200, depending on whether it is hingedly attached 304 to the left or right rear end side wall.

The attached structural member 401 of the conveyor 400 is connected to the hinged portion 305 via a drive mechanism 600. The folding structural member 402 is connected to the attached structural member 401 via drive mechanism 601. The hinged portion 305 and conveyor 400 in FIG. 9 can be rotated horizontally, placing the device 100 in a displaced position and permitting the vehicle 200 to be emptied via operation of the live floor 201 alone. The conveyor 400 can then be rotated horizontally in the opposite direction so that it covers the rear of the vehicle 200. The device 100 can then be latched to the vehicle by latch mechanism 202, making it suitable for travel.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

What is claimed is:

1. A device for unloading bulk material from a live floor bulk material hauling vehicle which has a top wall or side wall at the rear of the vehicle, the device comprising:
    a pivoting frame, the pivoting frame comprising a fixed portion that is fixed to the vehicle and a pivoting portion that is pivotably connected to the fixed portion at the top wall or side wall of the rear of the vehicle;
    at least one feeder that moves bulk material being dumped from the vehicle by action of the live floor onto
    a conveyor that accepts the material from the at least one feeder and conveys it outwardly from the vehicle to a desired location; where the conveyor is pivotably attached to the pivoting frame can be pivoted to a first position whereby bulk material can be unloaded from the vehicle by operation of the live floor and the conveyor, and a second position whereby the conveyor is displaced sufficiently from the vehicle that bulk material can be unloaded from the vehicle by operation of the live floor without operation of the conveyor.

2. The device according to claim 1, wherein the live floor bulk material hauling vehicle has a front end and a rear end and unloads from the rear end.

3. The device according to claim 1, wherein the conveyor is attached to a pivoting frame which is attached to the vehicle by a hinge.

4. The device according to claim 3, wherein the pivoting frame has a fixed portion that is attached to a rear end of the vehicle and a pivoting portion that is attached to the fixed portion by a hinge.

5. The device according to claim 4, wherein the at least one feeder is attached to the pivoting portion of the frame.

6. The device according to claim 1, wherein the conveyor has a feed end and a discharge end and is hinged at some point between the feed end and the discharge end.

7. The device according to claim 6, wherein the conveyor is hinged at a location that permits the conveyor to be stowed for travel.

8. The device according to claim 6, wherein the conveyor has a hinged mounting at the feed end that permits the conveyor to have an inclined angle so that the discharge end is higher than the feed end.

9. The device according to claim 8, where the inclined angle of the conveyor, from the feed end to the discharge end, is no greater than 36°.

10. The device according to claim 8, where the inclined angle of the conveyor, from the feed end to the discharge end, is no greater than 18°.

11. The device according to claim 1, wherein the conveyor is about the same width as that of the vehicle.

12. The device according to claim 1, wherein the conveyor is selected from the group consisting of drag, apron, bucket, chain, flight, slats, wheel, towline, trolley, pneumatic, roller, screw, auger, and belt-type conveyors.

13. The device according to claim 1, wherein the conveyor is a belt type conveyor.

14. The device according to claim 1 wherein the at least one feeder comprises two feeders located at varying heights near the rear of the vehicle, the upper feeder moving bulk materials toward the feeder below it.

15. The device according to claim 1 wherein the at least one feeder comprises three feeders located at varying heights near the rear of the vehicle, the upper two feeders moving bulk materials toward the feeder below it.

16. The device according to claim 1, wherein the at least one feeder is selected from a counter-flight screw, two screw, beater, barbed bar, or fluffing bar with tapered chute.

17. The device according to claim 1, wherein the at least one feeder is a centering feeder.

18. The device according to claim 1, wherein the live floor bulk material hauling vehicle is a trailer.

19. The device according to claim 18, wherein the trailer is a reciprocating slat type trailer.

20. A bulk material hauling vehicle having attached thereto an unloading device according to claim 1.

21. A device for unloading bulk material from a live floor bulk material hauling vehicle, the device comprising:
   at least one feeder that moves bulk material being dumped from the vehicle by action of the live floor onto
   a conveyor that accepts the material from the at least one feeder and conveys it outwardly from the vehicle to a desired location; where the conveyor is attached to a pivoting frame which has a fixed portion that is attached to a rear end of the vehicle and a pivoting portion that is attached to the fixed portion by a hinge at the top of the rear end of the vehicle, and wherein the device can be pivoted to a first position whereby bulk material can be unloaded from the vehicle by operation of the live floor and the conveyor, and a second position whereby the conveyor is displaced sufficiently from the vehicle that bulk material can be unloaded from the vehicle by operation of the live floor without operation of the conveyor.

22. A device for unloading bulk material from a live floor vehicle which has a top wall or side wall at the rear of the vehicle, the device comprising:
   a pivoting frame comprising a fixed portion that is fixed to the vehicle and a pivoting portion that is pivotably connected to the fixed portion at the top wall or side wall of the rear of the vehicle; a conveyor attached to the pivoting frame; and at least one feeder that receives bulk material that is discharged by the live floor and feeds the material onto the conveyor, wherein the pivoting frame can be pivoted to:
   a first position which permits the vehicle to be emptied by operation of the live floor and conveyor; and
   a second position which displaces the conveyor away from the vehicle and permits the vehicle to be emptied by operation of the live floor alone.

* * * * *

UNITED STATES PATENT AND TRADEMARK OFFICE
CERTIFICATE OF CORRECTION

| | | |
|---|---|---|
| PATENT NO. | : 7,374,389 B2 | Page 1 of 1 |
| APPLICATION NO. | : 11/203757 | |
| DATED | : May 20, 2008 | |
| INVENTOR(S) | : Jim Wilson | |

It is certified that error appears in the above-identified patent and that said Letters Patent is hereby corrected as shown below:

Column 8, line 55, delete the term "a".

Signed and Sealed this

Nineteenth Day of August, 2008

JON W. DUDAS
*Director of the United States Patent and Trademark Office*